(12) United States Patent
Sapiejewski et al.

(10) Patent No.: US 6,333,982 B1
(45) Date of Patent: Dec. 25, 2001

(54) HEADSET ADJUSTING

(75) Inventors: Roman Sapiejewski, Boston; Michael J. Monahan, Needham, both of MA (US)

(73) Assignee: Bose Corporation, Framingham, MA (US)

( * ) Notice: Subject to any disclaimer, the term of this patent is extended or adjusted under 35 U.S.C. 154(b) by 672 days.

(21) Appl. No.: 08/625,352

(22) Filed: Apr. 1, 1996

(51) Int. Cl.[7] .................................................. H04M 1/00
(52) U.S. Cl. ........................................................ 379/430
(58) Field of Search ............................ 379/430; 381/183, 381/187, 370, 374, 376, 379, 383

(56) References Cited

U.S. PATENT DOCUMENTS

| | | | |
|---|---|---|---|
| 4,551,584 | 11/1985 | Mathiasen | 179/156 R |
| 4,989,271 | 2/1991 | Sapiejewski et al. | 2/209 |
| 5,056,161 | 10/1991 | Breen | 2/209 |
| 5,185,807 | * 2/1993 | Bergin et al. | 381/187 |
| 5,293,647 | * 3/1994 | Mirmilshteyn et al. | 381/183 |
| 5,590,213 | * 12/1996 | Urella et al. | 381/187 |

* cited by examiner

*Primary Examiner*—Jack Chiang
(74) *Attorney, Agent, or Firm*—Fish & Richardson P.C.

(57) ABSTRACT

A headset has a headband and at least a first earphone. A coupler comprising a pivot having a torque resistance opposing the rotation of said pivot intercouples the headband and first earphone. The pivot includes a torque adjuster establishing said torque resistance.

10 Claims, 13 Drawing Sheets

HEADSET ADJUSTING

BACKGROUND OF THE INVENTION

The invention relates to headsets, and more particularly to adjustable headsets. For background reference is made to U.S. Pat. Nos. 5,056,161 and 4,989,271.

It is an important object of the invention to provide an improved headset.

According to the invention, the headset includes a headband coupled to at least one earphone by a high torque resistance pivot which can be manually set.

In another aspect of the invention, a headset includes a headband constructed and arranged for transferring a portion of the force applied by the headband to a temporal region of the user, and for modifying the portion of the force applied to the temporal region of the user.

In still another aspect of the invention, a headphone has a system for symmetrically adjusting the position of the earphones on the headband.

In another aspect of the invention, a headband opens to an opening of variable size, and the headband has rigid structure for limiting the size of the opening.

BRIEF DESCRIPTION OF THE DRAWINGS

Other features, objects, and advantages will become apparent from the following detailed description, which refers to the following drawings in which.

DETAILED DESCRIPTION OF THE ILLUSTRATED EMBODIMENTS

Figure 1:
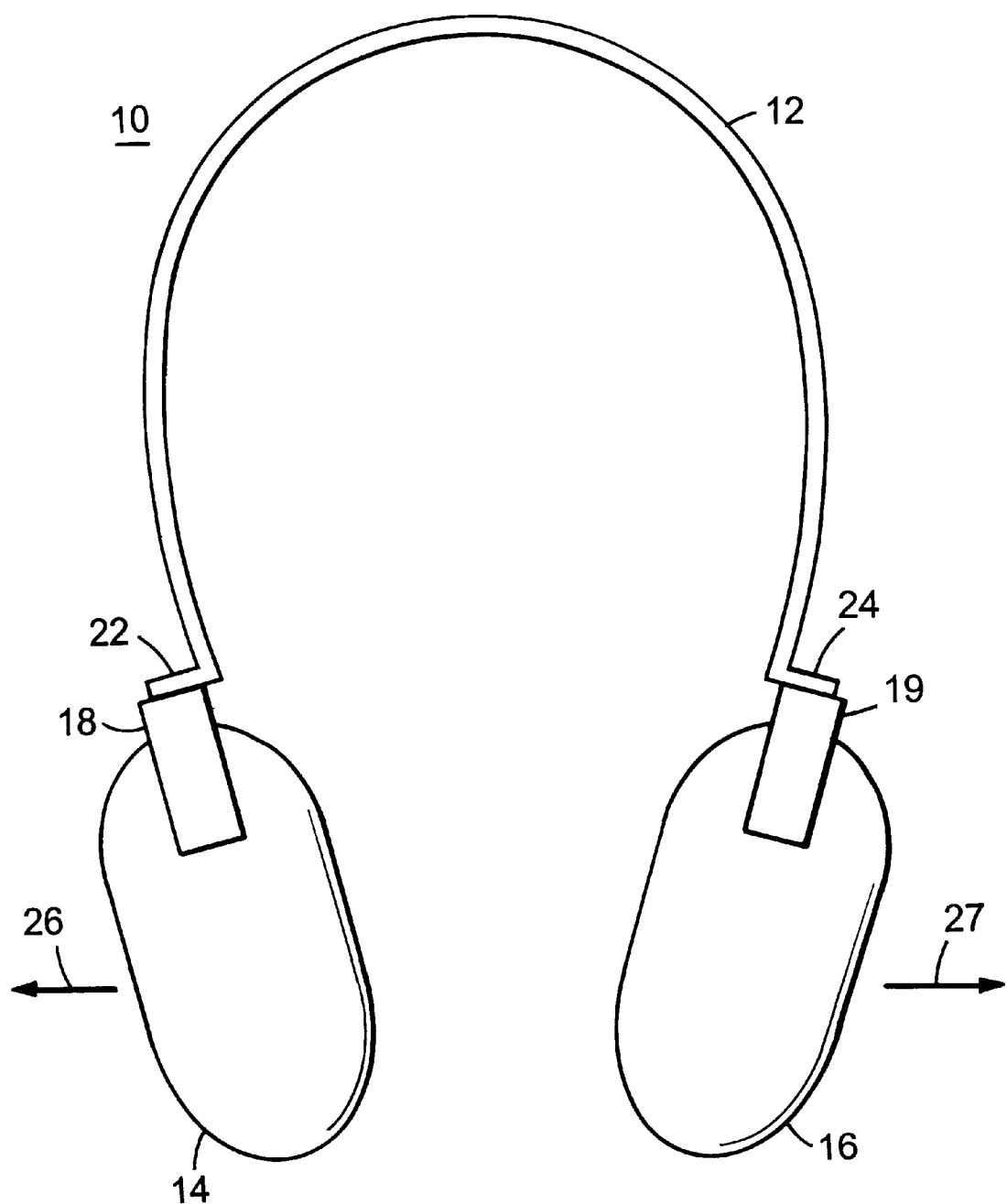
FIG. 1 is a front view of a headset according to the invention.

With reference now to the drawings and more particularly to FIG. 1, there is shown a headset 10 according to the invention in a relaxed position. A headband 12 in the form of an inverted u-shaped band is coupled to earphones 14, 16, by yokes 18, 19. The headband may also act as a spring element. When the distal ends 22, 24, of headband 12 are urged outwardly (in a direction indicated by arrows 26, 27) from the relaxed position, the spring element exerts a force urging the distal bands inwardly toward the relaxed position. The dimensions and the geometry of headband 12 are selected such that the distal ends 22, 24 are urged outwardly to fit around the head of the user, and the spring element exerts a force urging distal ends 22, 24 inwardly to press earphones 14, 16 against the user's ears or the areas around them.

Figure 2:
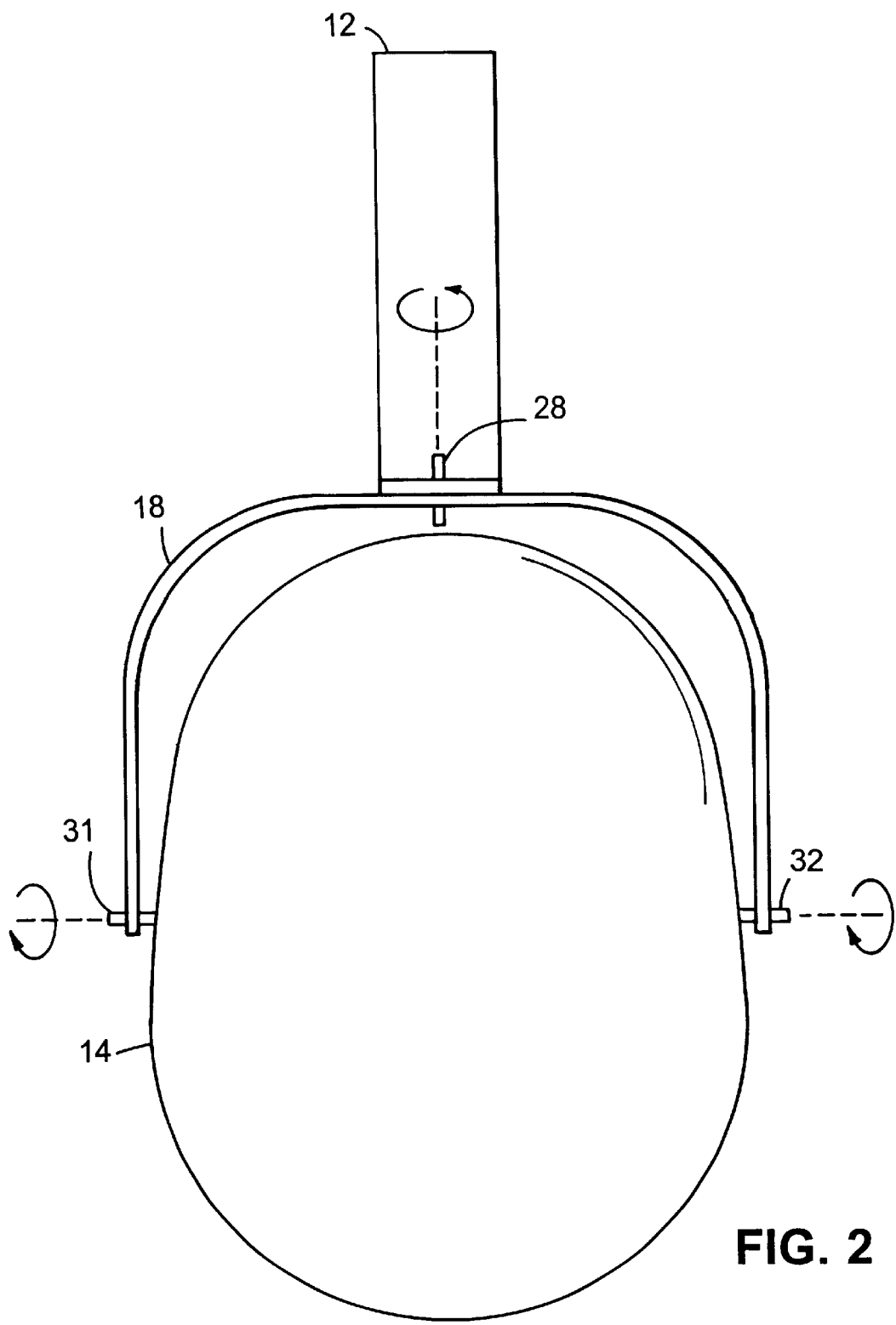
FIG. 2 is a side view of a headset according to the invention.

Referring now to FIG. 2, there is shown a yoke and earphone assembly according to the invention. The headband 12 is pivotally attached to the yoke 18 by a vertical pivot 28 so that yoke 18 can rotate in the direction shown. Yoke 18, in turn, is pivotally attached to earphone 14 by two horizontal pivots 31, 32 so that earphone 14, can rotate about the axis as shown. The rotational position of the pivots defines the orientation of the earphones to the user's head. The vertical pivot 28 and the two horizontal pivots 31, 32 are high torque resistance pivots, so that they do not rotate freely, but rather require applying a torque exceeding a predetermined threshold value to cause rotation. The required torque threshold level may be adjustable. Greater detail of various embodiments of the pivots are shown in FIGS. 3, 4a and 4b.

Figure 3:
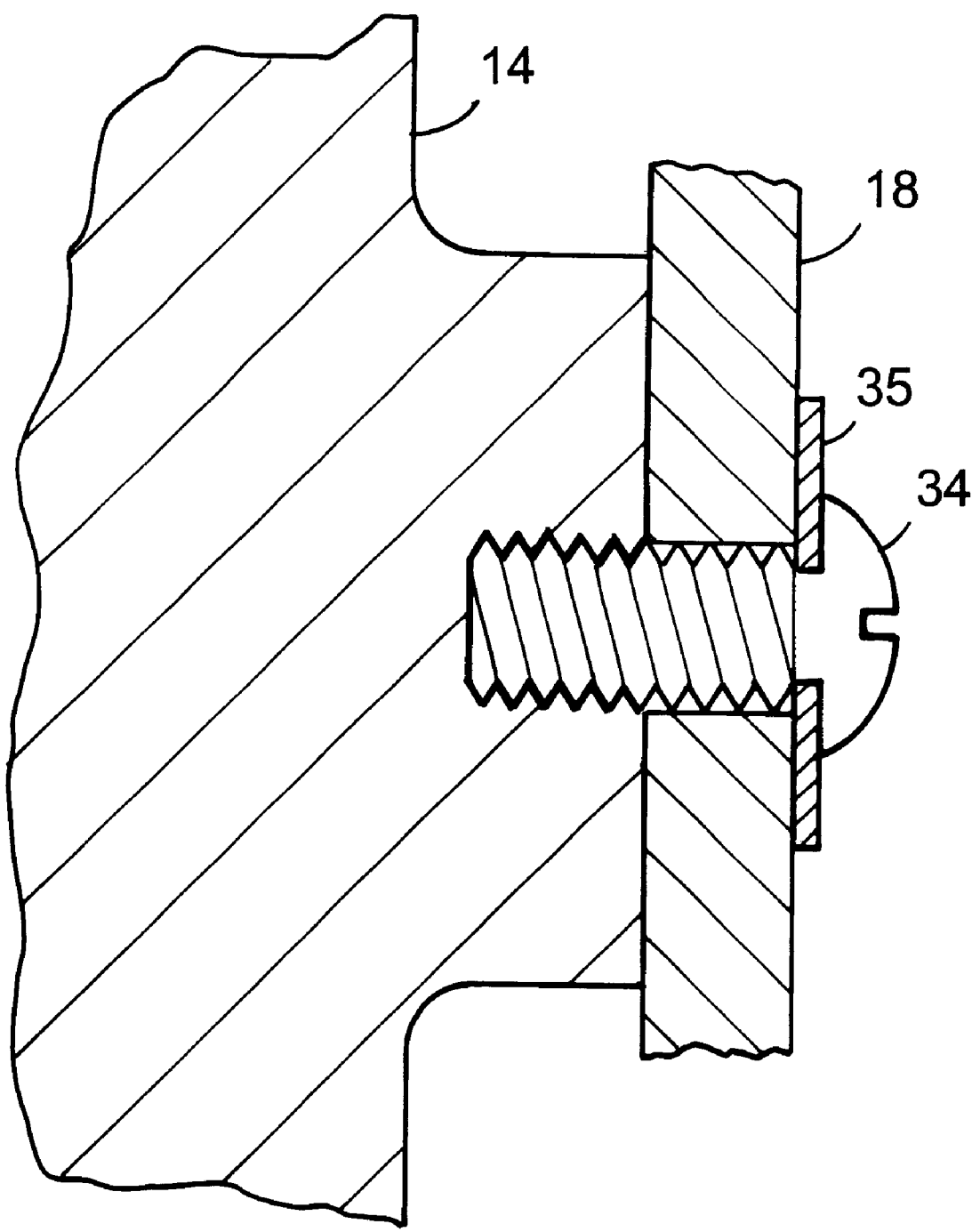
FIG. 3 is a partial cross section of a high torque resistance pivot according to the invention.

Referring to FIG. 3, there is shown a high torque resistance pivot that may be used for vertical pivot 28 and horizontal pivots 31, 32. The yoke 18 may be attached to earphone 14 by a screw 34 and a washer 36 so that yoke 18 can rotate about screw 34. Screw 34 may be tightened to urge the mating surfaces together, thereby increasing the frictional torque resistance between yoke 18 and the earphone 14 (and torque threshold value). A suitable compound (such as "Loctite") can be used to inhibit screw 34 from loosening.

Figure 4A:
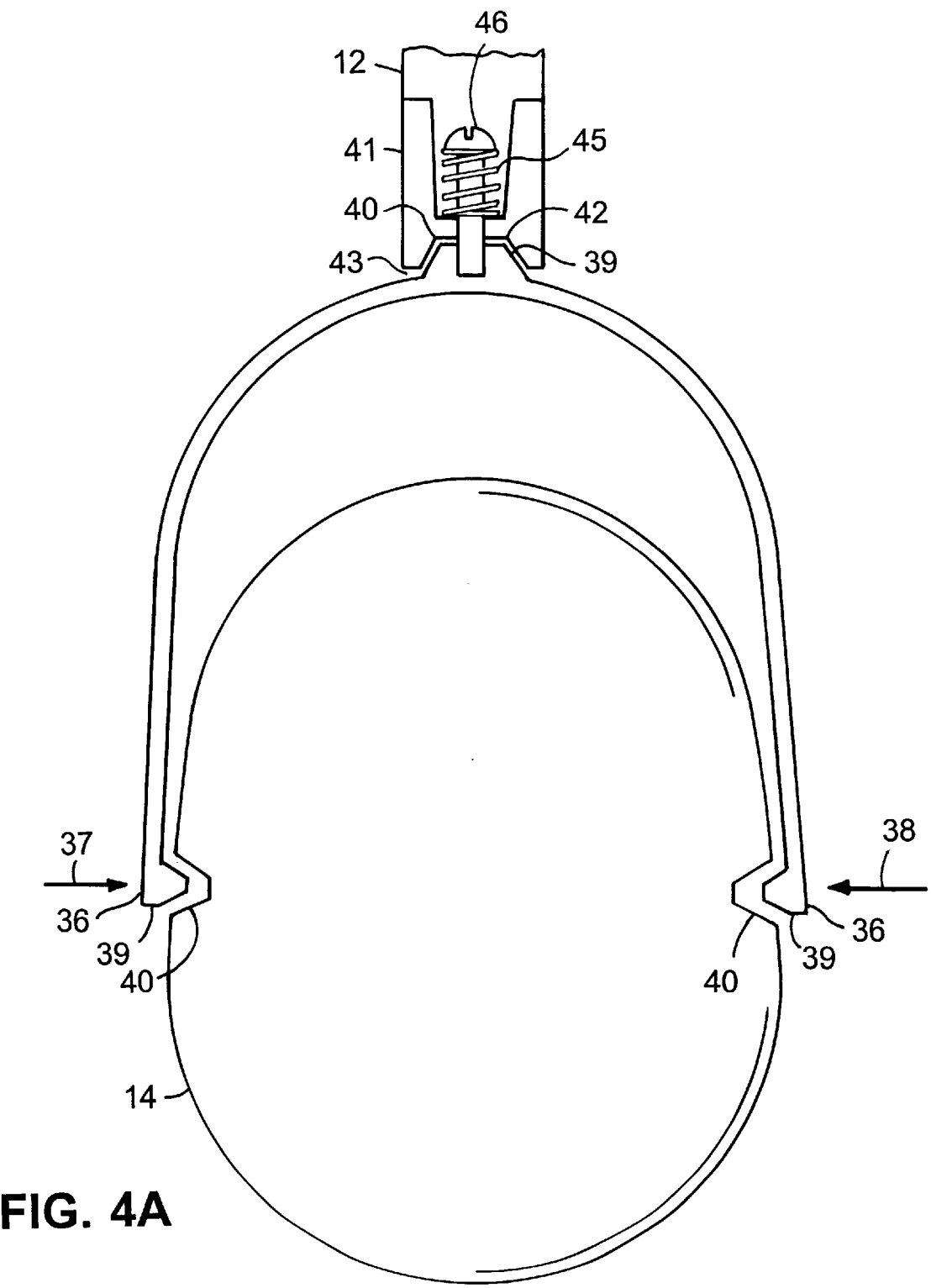
FIG. 4a is cross-sectional side view of an earphone and headband assembly according to the invention.

Referring to FIG. 4a, there is shown an alternate pivot that may be used for horizontal pivots 31, 32. The contacting surfaces of yoke 18 and earphone 14 may be of some nonplanar geometry, shape, such as oblique surfaces defining a cone shaped male cone member 39 and a cone shaped female socket 40. Force in the direction of the arrows 37, 38 (which may be supplied by spring force of the yoke) urges the mating surfaces of a male cone or clutch member 39 and a female clutch socket 40 together, thereby increasing the frictional torque resistance between the two surfaces (and torque threshold value). The amount of friction, and thus the torque resistance, may be adjusted by selection of appropriate materials for the male cone member and the female socket, by the geometry and dimensions of the male cone member and the female socket, and by varying the force applied to the clutch member 39 and clutch socket 40.

Figure 4B:
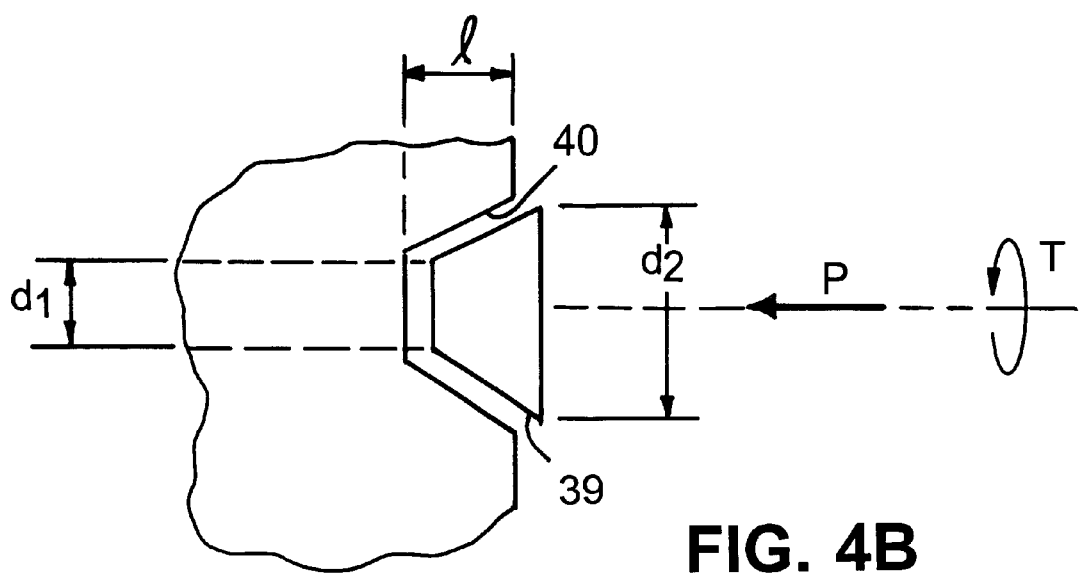
FIG. 4b is a diagrammatic view of a high torque resistance pivot for the purpose of illustrating dimensions of an embodiment of the invention.

Referring to FIG. 4b, there is shown an exemplary embodiment of the pivot of FIG. 4a, to illustrate typical dimensions of the components. With a male cone section of a hard elastomer such as urethane, and a female socket of a smooth hard plastic such as ABS, yielding a coefficient of friction in the range of 0.30–0.40 with a typical value of 0.38, an axial load P of 1.32 lb., a diameter $d_1$ of 0.242 inches, a diameter $d_2$ of 0.30 inches, a length 1 of 0.30 inches, a torque resistance T (and torque threshold value) of approximately 0.71 in-lb. results. A torque resistance in the range of 0.71 in-lb. is sufficient to hold the pivot in place in normal usage, and to be adjustable by hand (when exceeded).

Referring again to FIG. 4a, there is also shown a different type of high torque-resistance pivot, for vertical pivot 28.

There is a male clutch member 39 and a female clutch socket 40, and the force is applied by a spring 45 and spring retainer 46. The spring retainer may be a bolt and threaded receptacle assembly as shown or may be a post and clip-on retainer, or one of many other retainer mechanisms known to those skilled in the art.

FIGS. 3, 4a, and 4b disclose specific embodiments for high torque-resistance pivots. However, there are other embodiments of high torque-resistance pivots which, combined with the teachings of this disclosure, could be readily adapted to a headband and earphone assembly by those skilled in the art. Additionally, there are techniques other than high friction, such as detents, radial grooves or ridges, and uneven mating surfaces, which provide high torque resistance and allow the user to set the rotational position of the pivots.

A headband incorporating high torque-resistance pivots is advantageous over headbands incorporating freely rotating pivots because high torque-resistance pivots allow the user to actively set and maintain a desired orientation of the earphones to the headband rather than passively accepting an orientation that may not be the most comfortable or effective. Various portions of the user's head may be less sensitive to pressure and therefore more pressure can be applied to that portion to provide a better acoustic seal, without adversely affecting comfort. On the other hand, the user may wish to apply less pressure to other areas of his or her head, if that area is particularly sensitive to pressure and if doing so still provides an adequate acoustic seal for the ambient noise level. Headbands employing pivots which allow the user to set the rotational position, allow the user to actively set a desired combination of comfort, acoustic seal, and stability.

Figure 5:
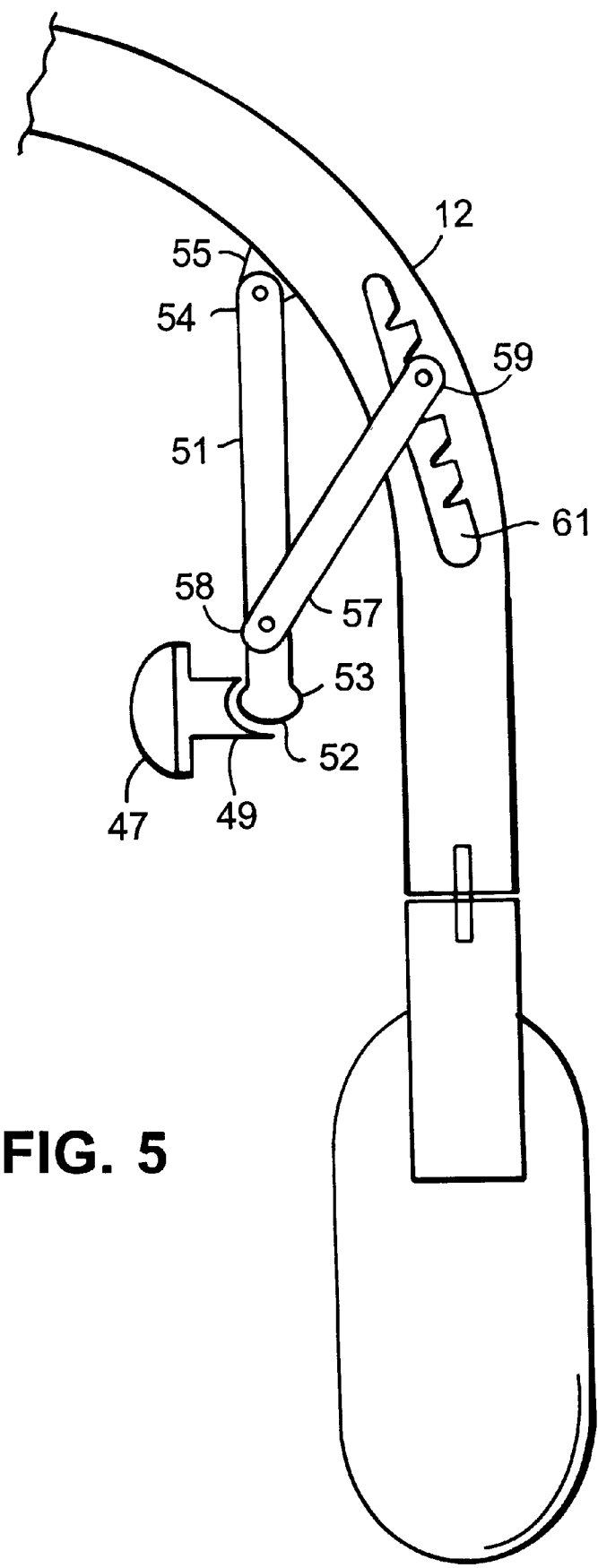
FIG. 5 is a partial front view of a headset and temporal support assembly according to the invention.

Referring to FIG. 5, there is shown a portion of headband 12 incorporating a temporal support. The temporal support may include a compliant, high friction pad 47 that pushes against the side of the head at the temporal region (that is, the region of the temporal muscle), which is above the ear. The temporal support also may include a support structure that allows adjustment of the distance between the headband and the pad. In one embodiment, the support structure may include a stem 49; a generally vertical member 51 coupled at one end 52 to the stem by a U-joint 53 or a ball joint with articulation limited principally to motion about an axis perpendicular to the plane of the drawing and coupled at the other end 54 to headband 12 by a hinge 55; an adjusting member 57 pivotally coupled at one end 58 to vertical member 51 and adjustably coupled at the other end 59 to a ratcheted slot 61 in headband 12. By adjusting the position in ratcheted slot 61 of the end 59 of adjusting member 57, the user can cause pad 47 to move in and out relative to the user's head, thereby transferring a portion of the force to the temporal area.

There are many other arrangements that, with the teachings of this invention, could be readily adapted by those skilled in the art to transfer a portion of the headband force to the temporal region of the head. Such arrangements may include inflatable systems, or mounting a pad on a threaded stem.

Transferring a portion of the force to the user's temporal region spreads the force over a larger area than if the force is applied only to the earphones. This feature allows greater force to be applied, thereby providing a better acoustic seal, holding the earphones securely in place and with greater stability, but without causing discomfort.

Figure 6:
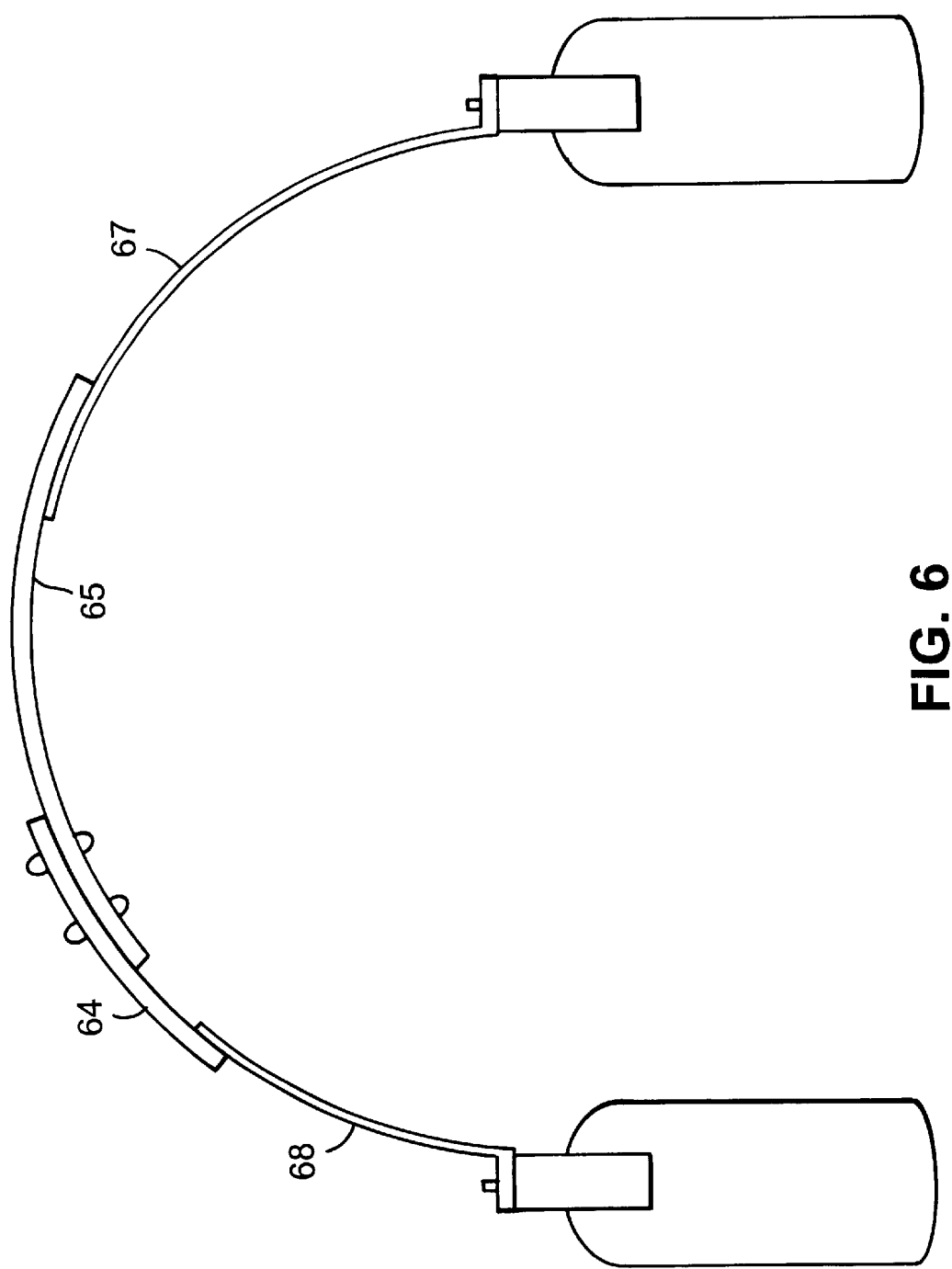
FIG. 6 is a front view of a headset assembly with symmetric adjustment mechanism according to the invention.

Referring to FIG. 6, there is shown an apparatus for adjusting the length of the headband symmetrically relative to a plane of symmetry passing through the midpoint of the headband. In the embodiment of FIG. 6, two overlapping, slidably attached relatively rigid headband sections 64, 65 slide relative to each other, thereby adjusting the length of the headband by adjusting the length of the rigid section while keeping the total length of the compliant spring sections 67, 68 constant. A movement lengthening or shortening one side of the headband lengthens or shortens the other side of the headband by the same amount and keeps the position of the earphones symmetric relative to the midpoint of the headband. Symmetric adjustment is advantageous for properly aligning the inward forces. Constant length of compliant spring sections is advantageous in furnishing an approximately constant inward force, regardless of the overall length of the headband.

Figure 7:
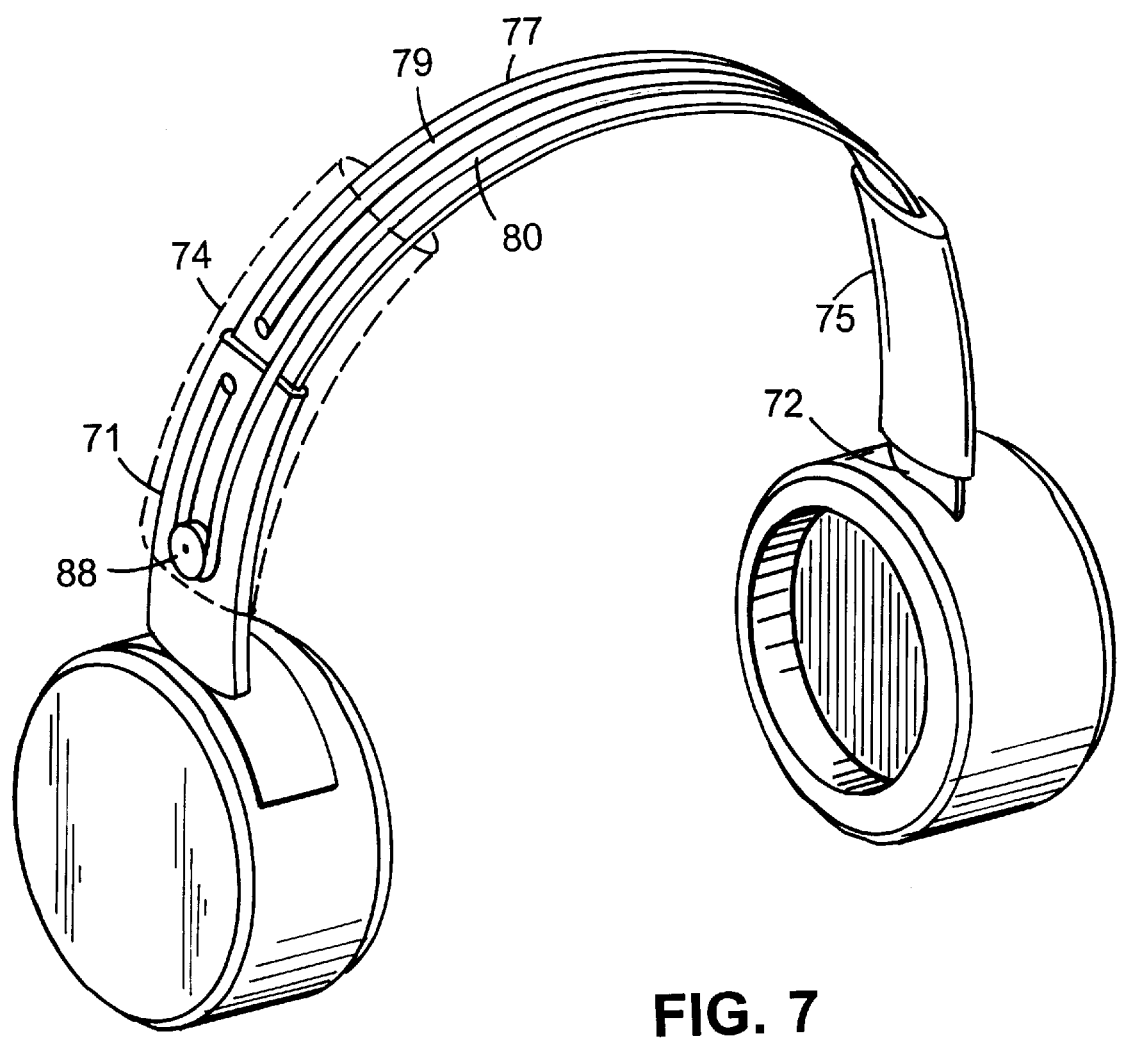
FIG. 7 is a partially cutaway perspective view of a headband assembly with an alternate symmetric adjustment mechanism.

Referring to FIG. 7, there is shown another apparatus for symmetrically adjusting the length of the headband while keeping the length of the compliant spring sections constant. First and second rigid slider sections 71, 72 slide in and out of first and second rigid guide sections 74, 75, respectively. The two guide sections are coupled by a fixed length spring section 77. A first coupler cord 79 is attached at one end to first slider section 71, wraps around a pulley 85 (not shown in this view) anchored to the second guide section 75, and attaches to the second slider section 72 (attachment not shown in this view). Similarly, a second coupler cord 80 may be attached to the second slider section 72 and wrapped around a pulley 88 anchored to the first guide section 74, and attached to the first slider section 71.

The pulley may be a conventional pulley, including a disk rotating about an axis, or may be some other arrangement that changes the direction of the tension in the coupler cord, such as a stationary post around which the coupler cord is positioned.

Figure 8A:
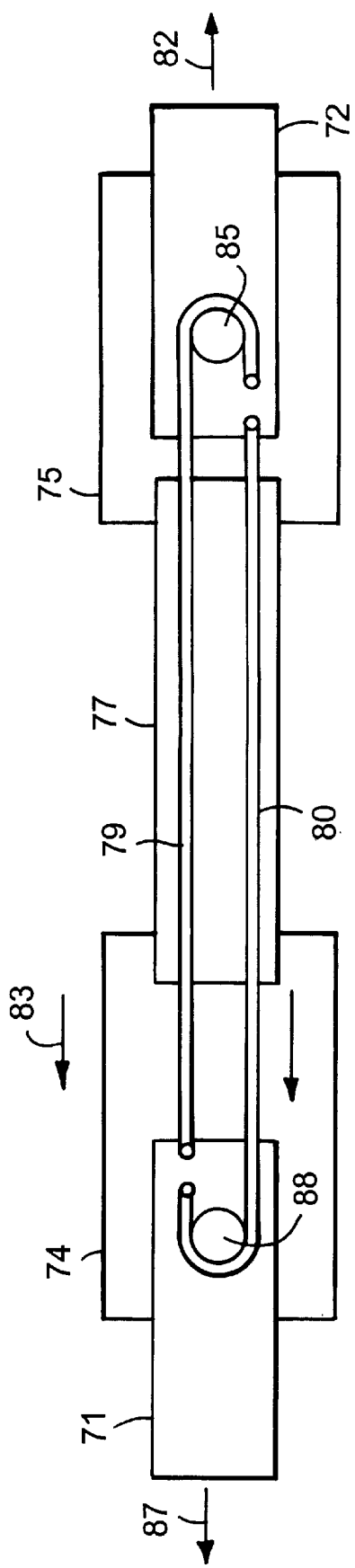
FIGS. 8a and 8b are diagrammatic view of the symmetric adjustment mechanism of FIG. 7.
Figure 8B:
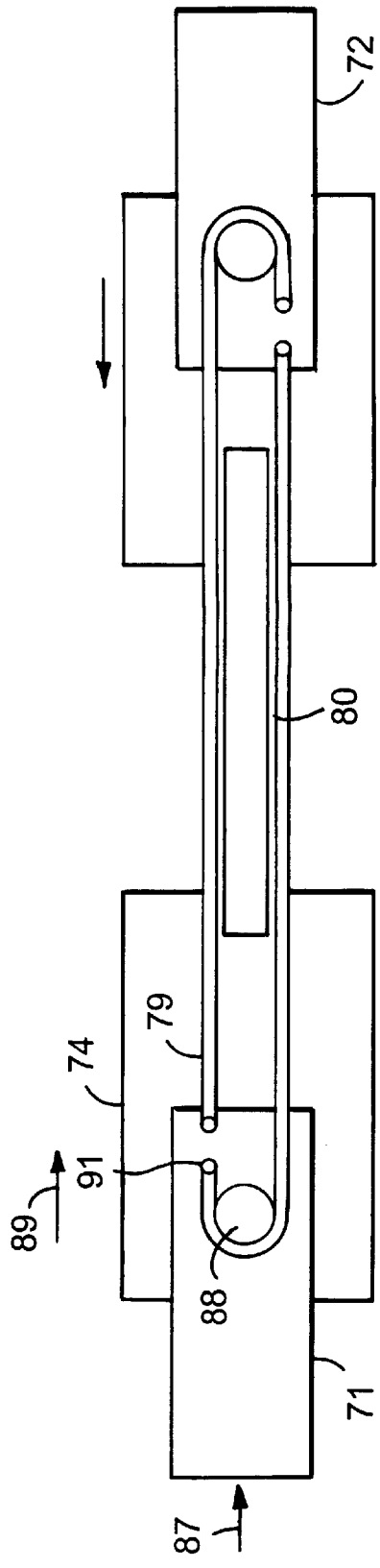

Referring to FIGS. 8a and 8b, there is shown a portion of the apparatus of FIG. 7 helpful in illustrating the mode of operation. In FIG. 8a, movement indicated by arrow 81 of first slider 71 from the first guide section 74 causes a pulling force 83 on the first coupler cord 79. The direction of the pulling force on the first coupler cord is changed by the pulley 85 anchored to the second guide section 75. The pulling force pulls the second slider section 72 from the second guide section 75 by the same amount as first slider 71 moved from first guide section 74. Similarly, if the second slider section 72 is moved along the direction of arrow 82 from the second guide section 75, first slider section 71 moves from first guide section 74 by the same amount as the second slider section 72 moved from guide section 75.

In FIG. 8b, movement indicated by arrow 87 of the first slider section 71 into first guide section 74 causes a pulling force 89 on the second coupler cord 80 at the anchor point 91. The direction of the pulling force on the second coupler cord 80 is changed by the pulley 88 anchored to the first guide section 74, which pulls the second slider section 72 into the second guide section 75 by the same amount as the first slider 71 moved into the first guide section 74. Similarly a movement of the second slider 72 into the second guide section 75 results in movement of the first slider 71 into the first guide section 74.

Figure 9A:
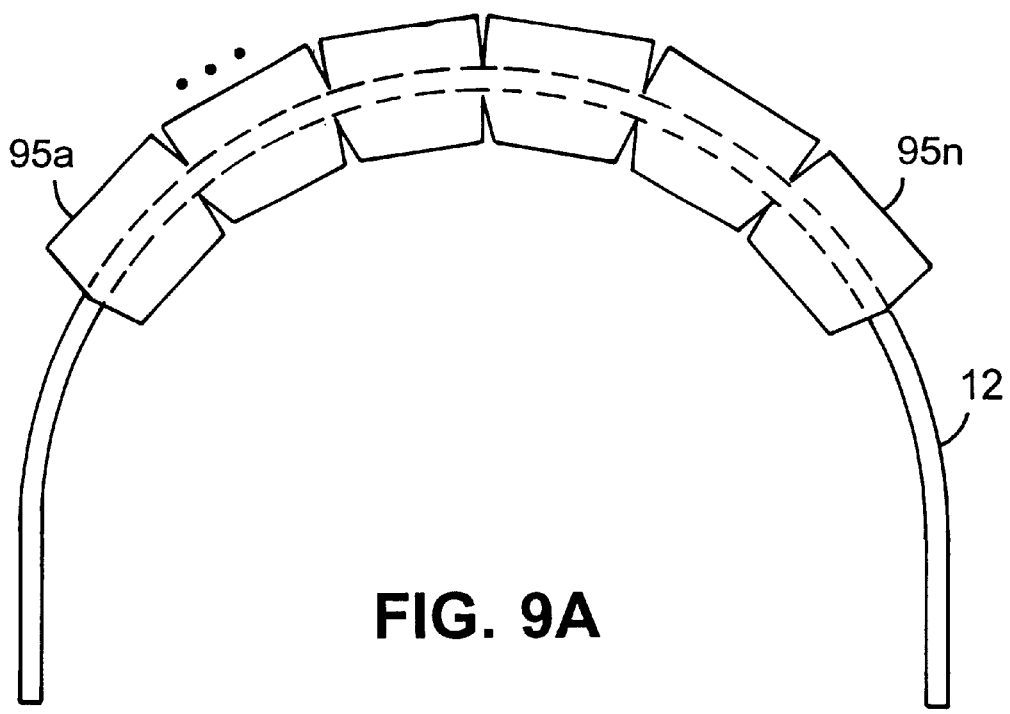
FIGS. 9a–9c are diagrammatic views of apparatus for defining a maximum and minimum opening of a headband according to the invention.
Figure 9B:
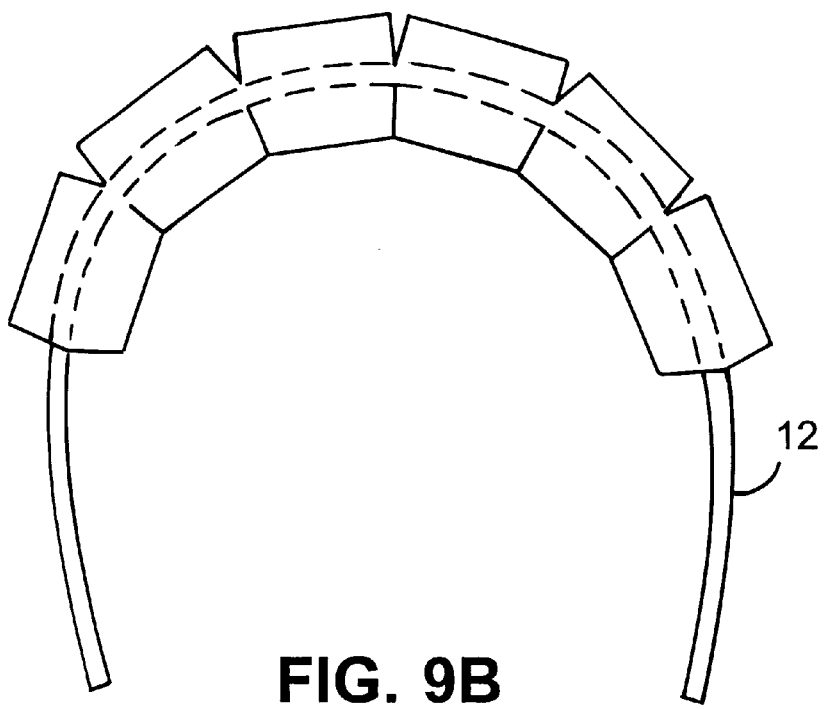
Figure 9C:
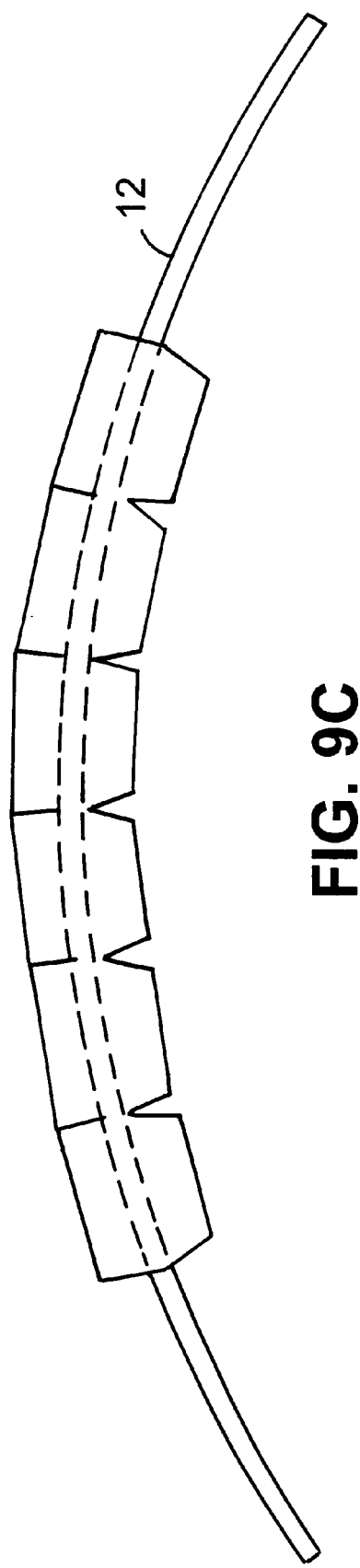

Referring to FIGS. 9a–9c, there is shown rigid apparatus for defining maximum and minimum openings of the headband. Beveled elements 95a . . . 95n are positioned on headband 12. At the minimum opening (FIG. 9b) lower beveled surfaces of adjacent beveled elements contact to prevent further closing of the headband in the vicinity of the beveled element. The cumulative effect of the plurality of beveled elements is to define a minimum opening of the headband. At the maximum opening, (FIG. 9c) the upper beveled surfaces of adjacent beveled elements contact each other to prevent further opening of headband 12 in the immediate vicinity of the beveled element. The cumulative effect of the plurality of beveled elements is to define a maximum opening of the headband.

Figure 10A:
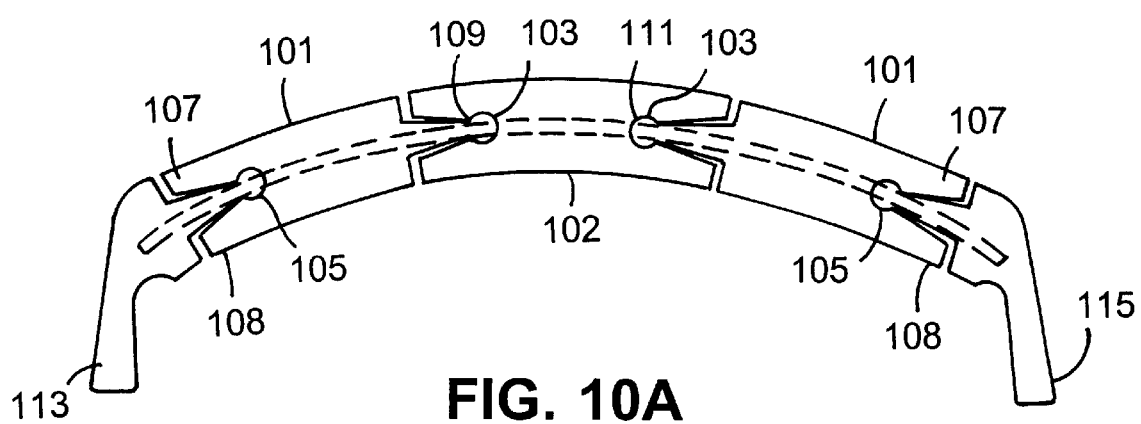
FIGS. 10a–10c are diagrammatic views of an alternate apparatus for defining a maximum and minimum opening of a headband according to the invention.
Figure 10B:
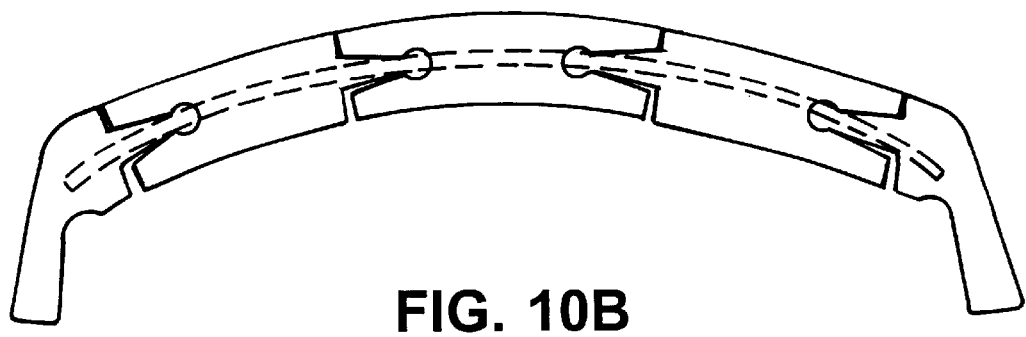
Figure 10C:
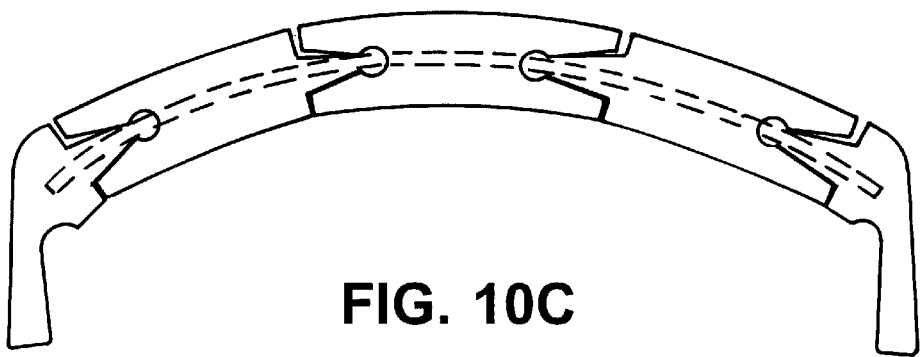

Referring to FIGS. 10a–10c, there is shown an alternative apparatus for defining maximum and a minimum openings of the headband. Limiting sections 101 are shaped so that in cross section they have a round tip. The limiting sections may also have a socket 105 into which the round tip of the adjacent limiting section fits in a manner such that a limiting section can pivot about an axis passing through the round tip of the limiting section and the socket of the adjacent limiting section, similar to a hinge. Flanges 107, 108 on each side of the socket may limit the amount by which each limiting section can rotate relative to the adjacent limiting section, acting similar to "stops" for the hinge. One limiting section 102 may be a central "keystone" section that has a socket at both ends. The end limiting sections 113, 115 may have a round tip and no socket. The assembled limiting sections are situated relative to the headband 12 such that the cumulative effect of the range of motions of the limiting sections is to define a maximum opening (FIG. 10b) and a minimum opening (FIG. 10c) of the headband.

The limiting sections may be wide enough that they allow movement about only one axis, thereby preventing torsion or sideways flexing of the headband, providing further protection for the spring element.

A headband according to the invention is advantageous because the headband exerts approximately constant inward forces over the intended range of opening. A headband according to the invention is advantageous because the spring element is protected from damage due to the headband being opened or closed beyond the intended limits.

Figure 11:
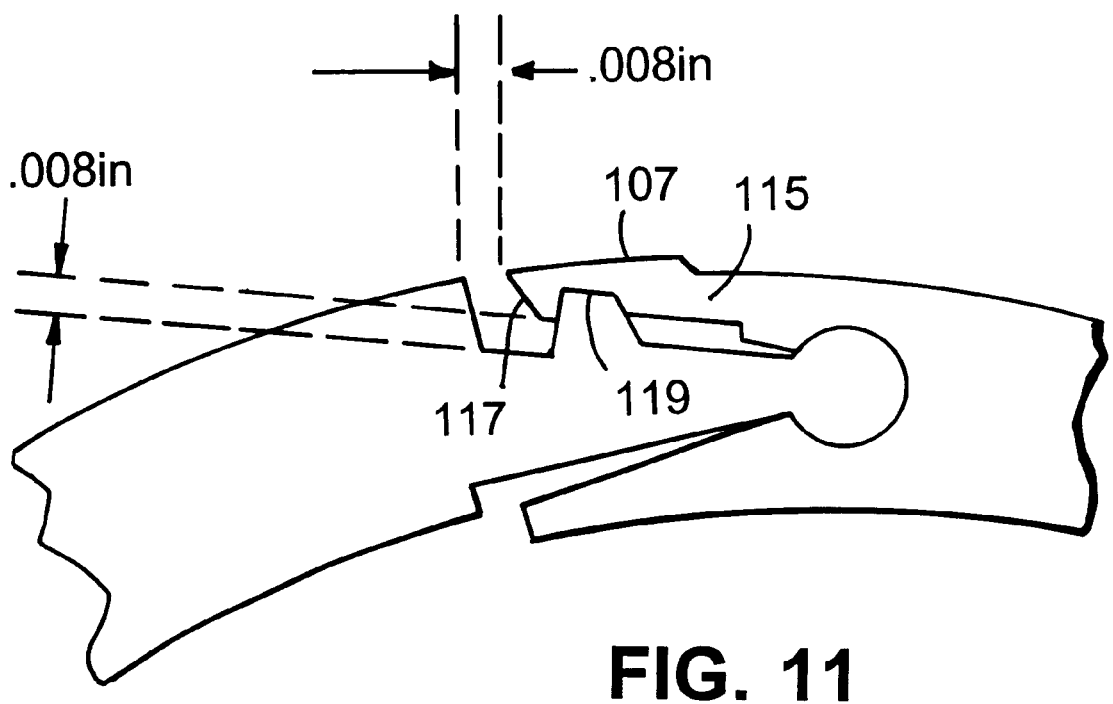
FIG. 11 is a diagrammatic view of a portion of an alternate configuration of the apparatus of FIGS. 10a–10c.

Referring to FIG. 11, there is shown an alternate configuration of the limiting sections of FIGS. 10a–10c that helps prevent user's hair from becoming entangled in the headband when the headband is removed and helps prevent the limiting sections from unintentional disassembly. A protrusion 115 on a limiting section contacts a flange 107 of the adjacent limiting section so that there is a gap of at least 0.008 inches between the limiting section and the flange of the adjacent limiting section at all points except for the point of contact. Since a human hair is on the order of 0.004 inches in diameter, hair which may be in the channel is not pinched by the contacting surfaces. A second protrusion 117 on the end of a flange of the adjacent limiting section prevents the round tip from "popping out" of the socket under a tensile load.

Other embodiments are within the claims.

What is claimed is:

1. A headset comprising;
   a headband;
   a first earphone;
   a coupler coupling the headband and the earphone comprising a pivot having a torque resistance opposing the rotation of said pivot intercoupling said headband and said earphone constructed and arranged to require applying a torque exceeding a predetermined threshold value to cause rotation;
   said pivot including a torque threshold level adjuster establishing said threshold level.

2. A headset in accordance with 1, wherein said pivot comprises two mating surfaces and wherein said torque threshold level adjuster is constructed and arranged for urging said two mating surfaces together.

3. A headset in accordance with claim 2, wherein said two mating surfaces comprise planar surfaces.

4. A headset in accordance with claim 2, wherein said two mating surfaces comprise oblique surfaces.

5. A headset in accordance with claim 1,
   wherein said headband is constructed and arranged for urging said first earphone against an ear of a user by applying a force to said earphone and includes a pad spaced from said earphone for transferring a portion of said force to a temporal region of said user through said pad;
   and further comprising a portion controller for controlling the portion of said force.

6. A headset in accordance with claim 5,
   wherein said headband has an inverted u-shape, with distal ends defining an opening of variable dimension; and
   rigid structure for limiting said variable dimension.

7. A headset in accordance with claim 6, wherein said first earphone is positioned at a first distance from a central point of said headband, and further comprising
   a second earphone, positioned at a second distance from said central point, said second distance being substantially equal to said first distance; and
   a distance adjuster for coactively adjusting said first distance and said second distance.

8. A headset in accordance with claim 1, wherein said headband has an inverted u-shape with distal ends defining an opening of variable dimension, and
   rigid structure for limiting said variable dimension.

9. A headset in accordance with claim 8, wherein said first earphone is positioned at a first distance from a central point of said headband, and further comprising
   a second earphone, positioned at a second distance from said central point, said second distance being substantially equal to said first distance; and
   a distance adjuster for coactively adjusting said first distance and said second distance.

10. A headphone in accordance with claim 1, wherein said first earphone is positioned at a first distance from a central point of said headband, and further comprising
    a second earphone, positioned at a second distance from said central point, said second distance being substantially equal to said first distance; and
    a distance adjuster for coactively adjusting said first distance and said second distance.

* * * * *